US 9,665,632 B2

(12) United States Patent
Morsi et al.

(10) Patent No.: US 9,665,632 B2
(45) Date of Patent: *May 30, 2017

(54) MANAGING ACTIVITIES OVER TIME IN AN ACTIVITY GRAPH

(71) Applicant: Magnet Systems, Inc., Palo Alto, CA (US)

(72) Inventors: Magdi Morsi, San Jose, CA (US); Robyn J. Chan, San Francisco, CA (US); Chih-Po Wen, Redwood City, CA (US)

(73) Assignee: Magnet Systems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/789,800

(22) Filed: Jul. 1, 2015

(65) Prior Publication Data
US 2015/0302068 A1    Oct. 22, 2015

Related U.S. Application Data

(63) Continuation of application No. 13/844,526, filed on Mar. 15, 2013, now Pat. No. 9,104,708.

(60) Provisional application No. 61/698,518, filed on Sep. 7, 2012.

(51) Int. Cl.
    G06F 17/30    (2006.01)
(52) U.S. Cl.
    CPC .. G06F 17/30563 (2013.01); G06F 17/30292 (2013.01); G06F 17/30303 (2013.01); G06F 17/30309 (2013.01); G06F 17/30551 (2013.01); G06F 17/30958 (2013.01)

(58) Field of Classification Search
    USPC .................................. 707/778, 798
    See application file for complete search history.

(56) References Cited

U.S. PATENT DOCUMENTS

| 5,047,918 | A  | * | 9/1991 | Schwartz | G06F 9/52 |
| 5,721,911 | A  | * | 2/1998 | Ha | G06F 17/30 |
| 7,027,055 | B2 |   | 4/2006 | Anderson et al. | |
| 7,143,434 | B1 | * | 11/2006 | Paek | G06F 17/30858 345/619 |
| 7,548,241 | B2 | * | 6/2009 | Marshall | G06T 17/20 345/428 |
| 7,836,028 | B1 | * | 11/2010 | Agarwal | G06F 17/30551 707/695 |

(Continued)

FOREIGN PATENT DOCUMENTS

WO    WO 2014/039877 A2    3/2014

OTHER PUBLICATIONS

International Search Report and Written Opinion from International Application No. PCT/US2013/058591 mailed Jan. 10, 2014.

(Continued)

Primary Examiner — Kim Nguyen
(74) Attorney, Agent, or Firm — Alston & Bird LLP

(57) ABSTRACT

Systems and processes for managing a data warehouse using an activity graph are disclosed. One example process may include selectively tracking new versions of an entity based on a tracking type, removing entities based on data retention rules, removing entities based on data decay rules, and summarizing decayed data.

27 Claims, 5 Drawing Sheets

(56) References Cited

U.S. PATENT DOCUMENTS

| | | | |
|---|---|---|---|
| 7,861,226 B1* | 12/2010 | Episkopos | G06F 11/3676 717/124 |
| 8,010,536 B2* | 8/2011 | Nemeth | G06F 17/30038 707/748 |
| 2003/0110472 A1* | 6/2003 | Alloing | G06F 8/71 717/122 |
| 2007/0073737 A1 | 3/2007 | Patterson | |
| 2007/0198603 A1 | 8/2007 | Tsioutsiouliklis et al. | |
| 2009/0313331 A1 | 12/2009 | Rasmussen et al. | |
| 2010/0010967 A1 | 1/2010 | Muller | |
| 2010/0169137 A1 | 7/2010 | Jastrebski et al. | |
| 2011/0131185 A1* | 6/2011 | Kirshenbaum | G06F 11/1448 707/654 |
| 2011/0148880 A1* | 6/2011 | De Peuter | G06T 11/206 345/440 |
| 2011/0186837 A1* | 8/2011 | Takahashi | G11C 16/0433 257/43 |
| 2011/0225116 A1 | 9/2011 | Gupta et al. | |
| 2012/0084340 A1 | 4/2012 | McCormack et al. | |
| 2014/0071135 A1 | 3/2014 | Morsi et al. | |
| 2014/0074770 A1 | 3/2014 | Morsi et al. | |

OTHER PUBLICATIONS

Notice of Allowance from U.S. Appl. No. 13/844,526 dated Apr. 10, 2015.
Office Action from U.S. Appl. No. 13/844,526 dated Dec. 19, 2014.
Office Action from U.S. Appl. No. 13/853,912 dated Feb. 1, 2016.
Office Action from U.S. Appl. No. 13/853,912 dated Feb. 2, 2015.
Office Action from U.S. Appl. No. 13/853,912 dated Jun. 23, 2015.

* cited by examiner

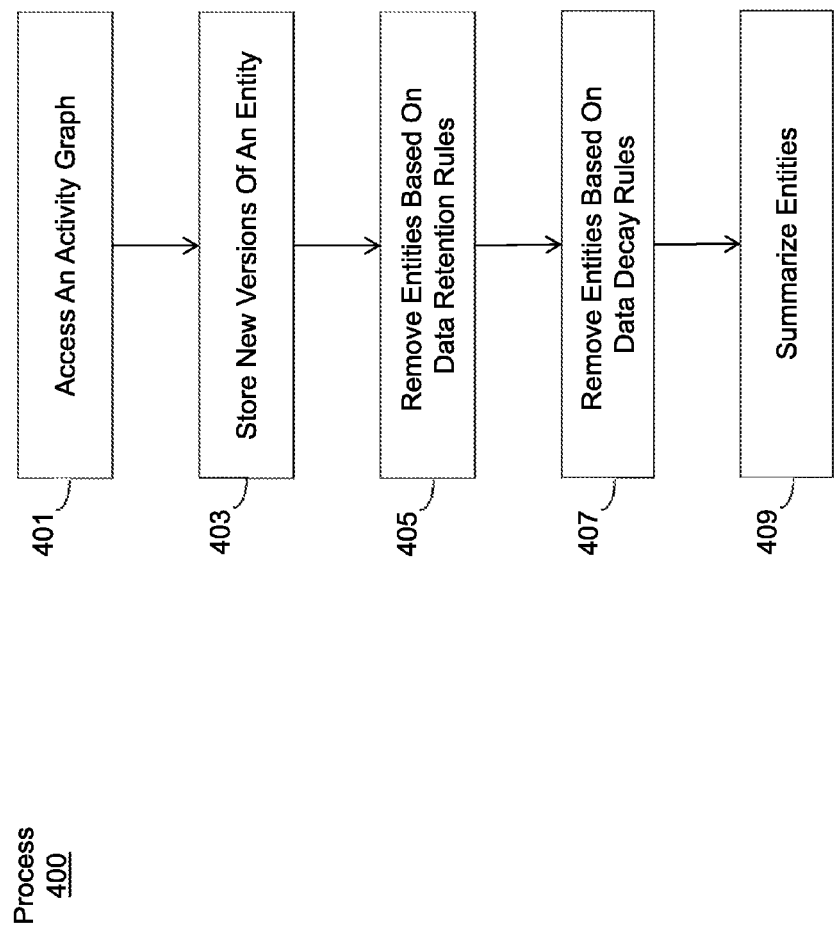

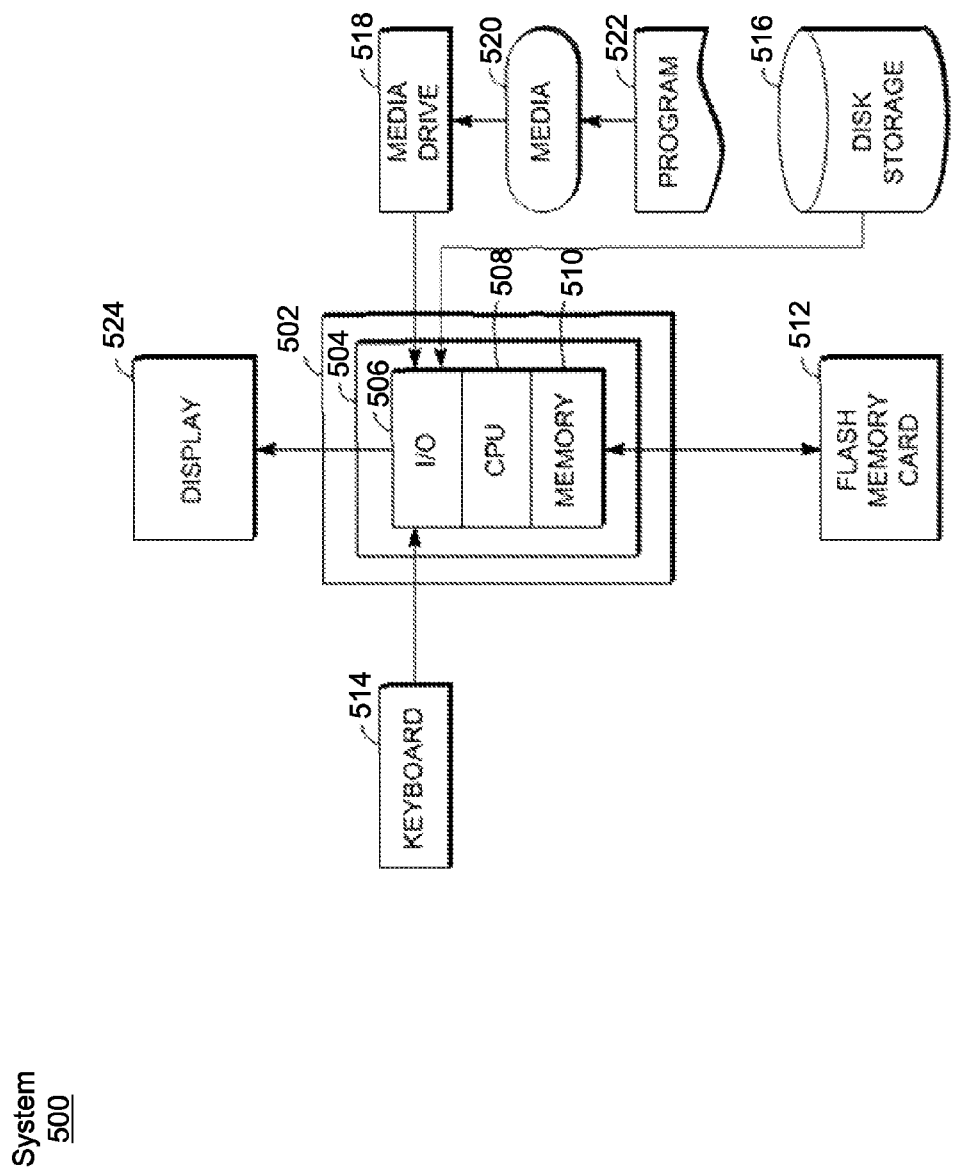

MANAGING ACTIVITIES OVER TIME IN AN ACTIVITY GRAPH

CROSS-REFERENCE TO RELATED APPLICATIONS

This application claims priority to U.S. Provisional Patent Application Ser. No. 61/698,518, filed Sep. 7, 2012, the entire disclosure of which is hereby incorporated by reference in its entirety for all purposes as if put forth in full below.

BACKGROUND

1. Field

The present disclosure relates to data warehouses and, in one particular example, to improved processes for managing data warehouses.

2. Related Art

Data warehouses are large repositories that integrate data from many different sources and are commonly used to store data for purposes of reporting and data analysis. In traditional data warehousing, entities and their attributes are mapped into dimensions, where a dimension refers to a data element that categorizes each item in a data set into a non-overlapping region. For example, as applied to a sales receipt, possible dimensions may include "Customer," "Date," and "Product." Dimensions provide filtering, grouping, and labeling and are needed to slice or aggregate data in various ways (e.g. per region, per sales person, per language, per item category, etc.).

Conventional data warehouses may store various types of data, such as measures (e.g., properties in a database on which calculations can be made, such as quantity of items sold or something which changes over time), their changes over time, and dimensions of interest, in data structures called fact tables. The fact tables provide the values that act as independent variables for analyzing dimensional attributes. Dimensions in this model are constructed from the attributes of interest as well as the changes to their values over time. To manage data warehouses storing data in fact tables, various data management techniques, such as a star schema, may be used. A star schema generally refers to a simple form of a scheme in a data warehouse that includes one or more fact tables that may reference any number of dimension tables. For example, a star schema for a data warehouse may include fact tables that include a measure and the identifiers for the dimensions and the set of tables describing each dimension. While generally effective, these data warehouses are fairly difficult to modify. For example, due to the complexity of building a data warehouse, the propagation of schema change is limited as it impacts both the target repository as well as the data pipeline that has been used to construct the warehouse by integrating data from multiple sources.

As data warehouses are being used to store larger amounts of data that change over time, it is becoming increasingly important to have proper data retention mechanisms to retain relevant data while deleting or archiving older, less relevant data. In some systems, data warehouses are physically separated into partitions based on a time period (e.g. by day, month, quarter or year). A common data retention mechanism used in these systems is to simply delete older partitions. While this results in predictable data retention, it may cause older, yet relevant data, to be archived or deleted. Improved systems and processes for managing data warehouses are desired.

SUMMARY

Processes for managing a data warehouse using an activity graph are disclosed. One example process includes accessing an activity graph comprising a plurality of interconnected nodes, wherein the plurality of interconnected nodes represent a plurality of entities; storing a new version of a first entity of the plurality of entities in the activity graph based on a change in an attribute associated with the first entity and a tracking type associated with the first entity; removing a second entity of the plurality of entities from the activity graph based on a data retention rule associated with the second entity; and removing a third entity of the plurality of entities from the activity graph based on an elapsed length of time and a data decay rule associated with the third entity.

In some examples, the plurality of entities represent a person, a user, a group, a computing resource, an activity, or an event. In other examples, three or more nodes of the plurality of nodes represent different versions of a fourth entity. In yet other examples, the process may further include summarizing the different versions of the fourth entity by merging at least two of the three or more nodes into a single node.

In some examples, the tracking type associated with the first entity identifies a type of attribute that causes the storing of the new version of the first entity in the activity graph. In other examples, storing the new version of the first entity in the activity graph based on the change in the attribute of the entity and the tracking type associated with the first entity may include inserting a new node representing the new version of the first entity into the activity graph if a type of the attribute is the type of attribute that causes the storing of the new version of the first entity in the activity graph.

In some examples, the data retention rule may identify a data removal condition comprising an expiration of the second entity, an expiration of all versions of the second entity, or an expiration of all edges of the second entity. In other examples, removing the second entity from the activity graph based on the data retention rule associated with the second entity comprises removing a node associated with the second entity from the activity graph in response to the occurrence of the data removal condition.

In some examples, the data decay rule comprises a threshold duration associated with the third entity. In other examples, removing the third entity from the activity graph based on the data decay rule associated with the third entity comprises removing a node associated with the third entity from the activity graph in response to the elapsed length of time exceeding the threshold duration, wherein the elapsed length of time represents a duration that the third entity has been expired.

Systems and computer-readable storage media for performing these processes are also disclosed.

BRIEF DESCRIPTION OF THE FIGURES

The present application can be best understood by reference to the following description taken in conjunction with the accompanying drawing figures, in which like parts may be referred to by like numerals.

FIG. 4 illustrates an exemplary process for managing data in a data warehouse using an activity graph according to various embodiments.

FIG. 5 illustrates an exemplary computing system that may be used to carry out the various embodiments described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various examples are described below relating to managing data in a data warehouse using an activity graph. One example process may include selectively tracking new versions of an entity based on a tracking type, removing entities based on data retention rules, removing entities based on data decay rules, and summarizing decayed data.

Activity Graph

Figure 1:
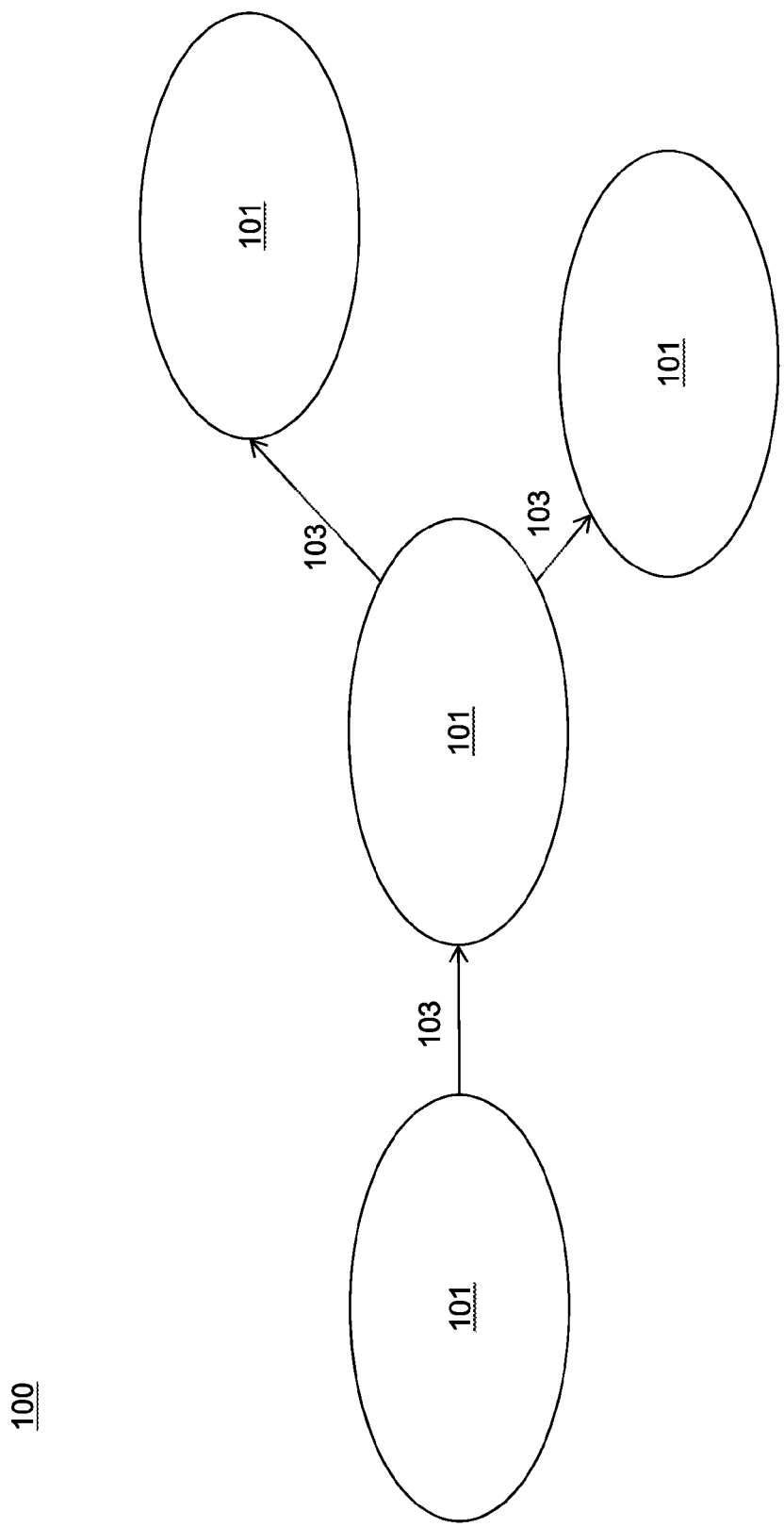
FIG. 1 illustrates an example activity graph according to various embodiments.

A data warehouse may be implemented using an activity graph according to various embodiments. FIG. 1 illustrates an example activity graph 100 comprising nodes 101 connected by edges 103. Each node 101 of the activity graph 100 may be associated with an entity, such as a person, a user, a group (e.g., an organizational unit grouped by building, department, company, etc.), content (e.g., a document, an email, image, etc.), a computing resource, an activity, an event, or the like. Thus, the node may represent the entity within the database.

In some examples, the basic node object may be sufficiently generic to handle any type of entity without having to change the pipeline or schema of the system. For example, if a system is capable of handling PDF documents, the pipeline or schema of the system need not be changed to handle Word documents. To accomplish this, the details that distinguish the different types of entities may be stored as attributes or information associated with the node. For example, the attributes for a person may include, name, birthday, gender, occupation, etc. In some examples, each node may further include a time period indicating the period during which that node or data associated with that node (e.g., attributes) is valid. In this way, the validity of the node and associated information may be stored and used for purposes of data management.

Edges 103 connecting nodes 101 may represent a relationship between the nodes 101 that they connect. Edges 103 may include information about a relationship type, a direction, the type of nodes being connected, the number of participants between each source and destination, properties and attributes of the edge type, and the like. The direction information of the edge is based on whether the edge is directed or undirected. For example, a directed edge has a direction of outgoing or incoming, whereas an undirected edge may not have a direction. In some examples, each edge may include a time period indicating the period during which that edge is valid. Time periods may also be included for information about the relationship represented by the edge.

Figure 2:
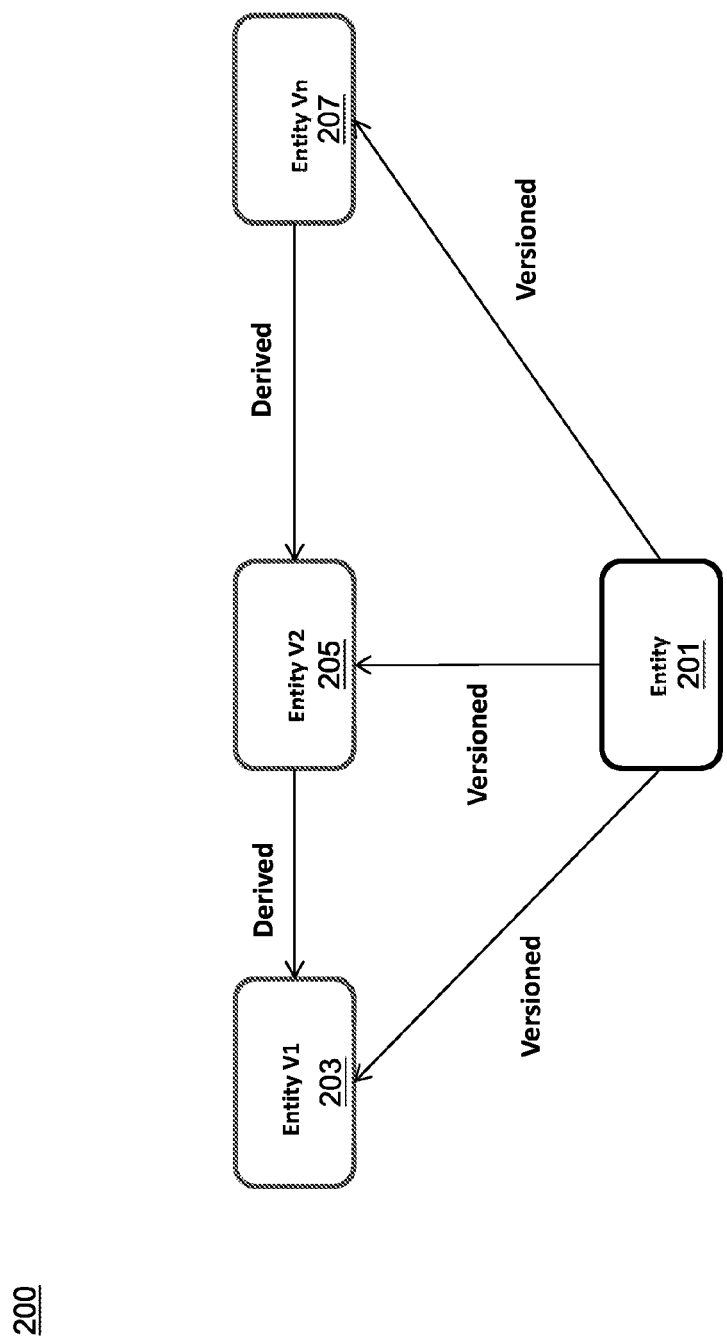
FIG. 2 illustrates an example logical data model for capturing changes over time in an activity graph according to various embodiments.

Since data warehouses are frequently used to store data that changes over time, activity graph 100 may be capable of storing one or more versions of the entities. To support such a feature, nodes 101 in the activity graph 100 may be used to represent versions of an entity. Thus, to represent an entity having multiple versions, multiple interconnected nodes 101 may be included within activity graph 100. To illustrate, FIG. 2 shows an example logical data model 200 for capturing changes over time. In this example, each version of the entity ($V_i$ 203, 205, and 207) may be versioned from a generic entity 201 and may be identified as being derived from a previous version. In some examples, the versions may be generated sequentially, while, in other examples, the versions may not be generated sequentially. As mentioned above, each node (e.g., version of the entity) may include information describing a time period during which that version is valid. In this way, the different versions of the entity and how to construct it from its most recent versions may be captured. The time period during which each version is valid may also be propagated to the versioned edges.

Figure 3:
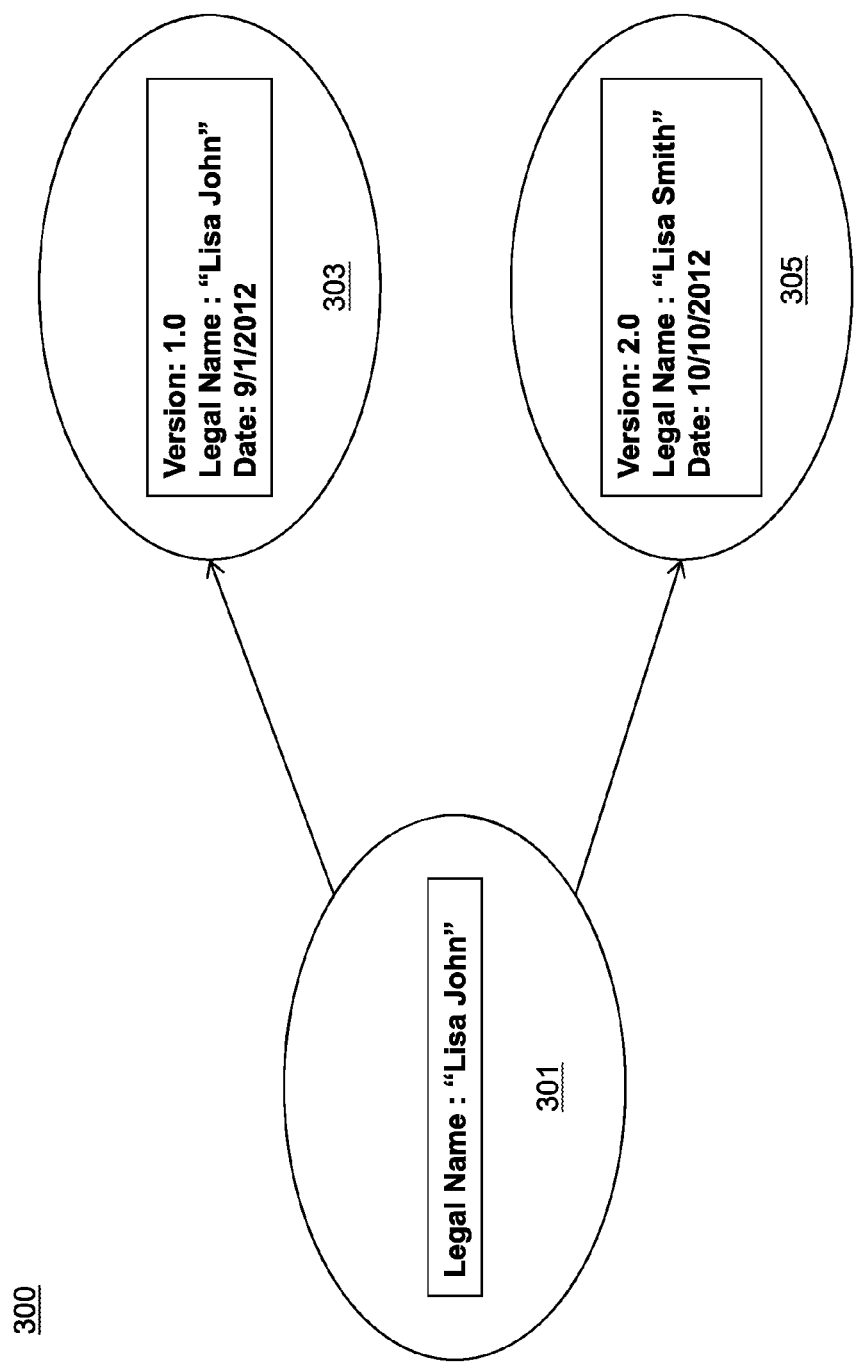
FIG. 3 illustrates an example activity graph being used to capture changes over time to an entity according to various embodiments.

To illustrate the use of an activity graph to store data that changes over time, FIG. 3 shows an example graph 300 that captures a change to an employee's legal name from "Lisa John" to "Lisa Smith" by adding a node that is connected to generic entity node 301. State node 303 may include the original state information of the employee. The original state information may be associated with a time stamp to identify when the information was added to node 303. At the time that state node 303 was generated, node 303 may include information indicating that the node is valid from Sep. 1, 2012-present. In response to Lisa John changing her name to Lisa Smith, state node 305 may be generated and may include a complete set of updated state information of the employee. The complete updated state information may be associated with a time stamp to identify when the information was added to node 305. At the time that state node 305 was generated, the information in node 303 indicating the valid period of time may change from Sep. 1, 2012-present to Sep. 1, 2012-Oct. 10, 2012. Additionally, state node 305 may include information indicating that the node is valid from Oct. 10, 2012-present. The edges of the graph shown in FIG. 3 may similarly include associated time intervals that indicate the time during which the edges are valid. In this example, the generic entity node 301 may point to the various possible versions of the state information of the employee. In another example, rather than storing a complete version of the state information of the employee, state node 305 may include a differential between the original state information stored in state node 303 and the updated state.

Identification of Tracked Entities and Properties

Before each entity may be monitored by an activity graph similar or identical to activity graph 100 or 300, the entity may be declared with various types of data. The types of data may include a name, collection to which it belongs, brief description, and various types of annotations. As such, each node representing these entities may similarly store these various types of data.

One type of annotation that may be selected when declaring an entity is a tracking type. The tracking type defines which attributes of the entity are to be tracked by the system and which may trigger a creation of a new version of the entity. The specific tracking type may be individually selected for each entity. In some examples, the tracking types may include no tracking, track all attributes, and track selective attributes.

The no tracking annotation may indicate that change tracking should not be performed for that entity. In other words, no version changes should be tracked by the activity graph. For instance, referring to the example shown in FIG. 3, when the legal name attribute is changed from "Lisa John" to "Lisa Smith," the system may not generate the new node 305 representing a new version of Lisa. Instead, the change may be made directly to node 303. Similarly, any change to any other attribute may not trigger the creation and insertion of another node into the activity graph since the no tracking annotation has been selected. However, if the entity is referenced via a relationship, a generic entity may be created.

The track all attributes annotation may indicate that any attribute change of the entity may trigger a new version of the entity. For instance, referring to the example shown in FIG. 3, when the legal name attribute is changed from "Lisa John" to "Lisa Smith," the system may generate the new node 305 representing a new version of Lisa. This new version may be created since the attribute "legal name" was changed. The system may similarly generate new versions of this user entity in response to a change in any other attribute, such as occupation, citizenship, residence, etc.

The track selective attributes annotation indicates that one or more attributes of the entity should be tracked and that new versions of the entity should be generated in response to such a change. For instance, referring to the example shown in FIG. 3, if a track selection attributes annotation is selected for a user entity and "legal name" is selected as one of the attributes to be tracked, the system may generate the new node 305 representing a new version of Lisa in response to the changing of Lisa's legal name from "Lisa John" to "Lisa Smith." However, changes to other attributes of the user (e.g., occupation, citizenship, residence, etc.) may not trigger the new version if these attributes were not selected as attributes to be tracked.

Using the tracking types discussed above, a user or administrator may configure the types of changes that may be tracked for different entities. This may be beneficial since certain changes may be important for one type of entity, while the same changes in a different entity may be irrelevant. As a result, the number of unnecessary versions stored in the activity graph may be reduced, thereby decreasing the storage space used by the system.

Data Management

As mentioned above, elements, such as nodes, edges, and data associated with nodes and edges, may include time periods indicating when the elements are valid. For example, a first version of a document may have been created on Jan. 1, 2013, and a second version of the document may have been created on Jan. 10, 2013. Thus, the first version may include information indicating that it is valid from Jan. 1, 2013-Jan. 10, 2013, while the second version of the document may include information indicating that is valid from Jan. 10, 2013-present. Thus, the second version of the document may be valid, but the first version is expired or not valid. While no longer valid, a user may still want to retain the first version as a point of reference or may later need that version to revert back to. Thus, it may be desirable to manage the activity graph using data removal policies that define when and how elements are deleted or removed from the system.

In some examples, the data removal policies may be individually configured for each declared entity. A data retention type annotation may be selected for each entity and may be used to define when entities should be removed from the system in response to events occurring within the activity graph. A data decay annotation may be selected for each entity and may be used to define when entities should be removed from the system based on elapsed time. In this way, a user or administrator may specifically define when and how entities should be removed or deleted from the system. Moreover, these removal policies may be independent of the physical medium on which the data is stored. For example, the deletion of data may be independent of a partition within the database on which it is stored.

Data Retention

A data retention type annotation may be selected for each entity and may be used to define when entities should be removed from the system in response to events occurring within the activity graph. The data retention types may include entity level, version level, and relationship level, and may generally define the conditions required to remove/delete an entity.

The entity level retention type annotation may indicate that data retention is based on the lifetime of the entity. In other words, once the entity expired as defined by its valid time duration, it is to be removed from the system (e.g., by removing the nodes from the activity graph). This may also include discarding the relationships to other entities in the activity graph (e.g., by removing the edges from the activity graph). For example, continuing with the document example above, the first version of the document was replaced with a second version on Jan. 10, 2013. If the entity level retention type was selected for this document, the node and edges associated with the first version may be removed from the activity graph as the entity (first version of the document) expired on Jan. 10, 2013. However, the second version of the document may be maintained since the time duration of Jan. 10, 2013-present indicates that the entity is still valid. This retention type may be selected, for example, to maintain only the most recent version of an entity.

The version level retention type annotation may indicate that data retention is based on expiration of the versions associated with the entity. That is, the entity may expire once all of its versions expire. Once there are no valid versions for an entity, the entity and all of its relationships may be removed (e.g., by removing all nodes and edges associated with the entity). For example, using the same document example provided above, the first version of the document may have expired on Jan. 10, 2013. However, a second version of the document was generated and is presently still valid. As such, if the version level retention type was selected for this entity, both the first version and second version of the document may be maintained in the system since a valid version exists. If, however, the second version of the document is flagged for deletion, then all versions of the entity will have expired and both versions may be deleted. This retention type may be selected, for example, to maintain only entities having at least one valid version.

The relationship level retention type annotation may indicate that the expiration of an entity is based on its relationships. That is, an entity expires when all of its relationships expire. For example, using the same document example provided above, the second version of the document may include a single relationship to a project entity, indicating that the document is required by the project. The relationship may include a time period indicating that the relationship is currently valid (e.g., that the document is currently required by the project). Thus, if the relationship level retention type was selected for this entity, the second version of the document may be maintained since it includes a valid relationship. If, however, the second version of the document is replaced with a different document, the time period of the relationship between the second version of the document and the project may indicate that the relationship is no longer valid. As a result, the second version of the document may be deleted since it no longer includes any valid relationships (assuming there are no other valid relationships to other entities). This retention type may be selected to ensure that the activity graph does not include disconnected entities. This may prevent, for example, retention of entity information of entities that are unrelated to any other entity in the activity graph (e.g., a document that is not required or being used by any user).

In some examples, a completely disconnected entity may not be automatically removed since even without existing valid relationships, its existence, relevant time period, and even its lack of relationships may be of interest.

In some examples, in addition to the retention type annotation, a retention period (e.g., configurable value representing the size of time to use, such as a millisecond, hour, day, week, month, quarter, year, etc.) may also be selected for an entity.

In order to efficiently manage data retention, in some examples, the physical clustering of the underlying store of the activity graph may be explored. This may include physical clustering of nodes and edges that are removed within the same period.

Data Decay

The second type of annotation that may be used to define the system's data removal policy is the data decay annotation. This annotation may be selected for each entity and may enable the system to purge versions of an entity based on elapsed time. Similarly, relationships (e.g., edges in the activity graph), attributes, and the like may also be deleted using data decay.

In some examples, data decay may remove an entity or associated information based on a duration that the entity or associated information was valid. For instance, if a document was valid for only a short period of time, the document may be removed more quickly after it is no longer valid than a document that was valid for a long period of time. Thus, the shorter an entity or associated information is valid in the system, the more quickly it expires. Additionally, the longer an entity or associated information is invalid, the less likely it is to be retained.

In some examples, data decay is computed by a periodic process. The frequency at which the computation is performed is configurable (e.g., configure the period between computations) as well as the difference between the last time the state of an entity, attribute, or relationship was valid (e.g., as defined by the time indicating the period that the entity is valid) and the current time (i.e., the time at which the retention process ran). Since each entity includes a time period identifying the times the entity is valid, data decay may be indicated by the beginning and end of the time period as well as the difference between the time period and the current time. For example, the period at which the data decay is computed may be configured to be one day, while the required length of time since the entity was valid is one week. Thus, each day, the system may check the entity to determine if the entity has been invalid for more than 7 days. If, when the data decay computation is performed, the entity has been invalid for more than 7 days, then the entity may be deleted from the system.

Summarization

In some examples, a summarization annotation may be selected for each entity and may be applied to entities, attributes, or relationships. A selection of the summarization annotation may cause the content of multiple versions to be combined into a single unit, thereby preserving at least some of the historical data. In this way, detailed changes can be replaced with summaries of these changes. The result of the summarization process when applied to multiple versions, each having an associated time period, is an aggregated set of versions with associated time periods. The entities, attributes, or relationships to be summarized may be summarized in response to two or more entities, attributes, or relationships expiring, a threshold length of time after expiring, or the like. In this way, a user or administrator may determine the level of detail retained for each item stored in the system.

In some examples, the summarization of relationships can be based on homogeneous relationships (e.g., a single relationship over time). Since each relationship edge has a time period, the collection of changes to the same relationship over time may be treated analogously to multiple versions of an entity as described above.

Data Management Process

FIG. 4 illustrates an exemplary process 400 for managing data in a data warehouse using an activity graph. At block 401, an activity graph may be accessed. The activity graph (e.g., activity graph 100 or 300) may include nodes (e.g., nodes 101) associated with entities connected together with edges (e.g., edges 103) representing relationships between the entities. The activity graph may be accessed by a processor from a local or remote database and may be used to store various types of data, such as users, contents, actions, entities, their associated relationships, their properties, versions thereof, and the like.

At block 403, a new version of that entity may be generated and stored based on a change in an attribute of the entity and a tracking type of the entity. In some examples, this may include generating another node in the activity graph representing the new version. Whether or not a new version of the entity is generated in response to the change in the attribute may be based on a tracking annotation that was selected for that entity. For example, as described above, an entity may include a tracking annotation (e.g., no tracking, track all, or track selective annotation) indicating which attributes, if any, may trigger the creation of a new version.

At block 405, a node associated with an entity may be removed from the activity graph based on a data retention rule (e.g., data retention annotation) associated with the entity. The entity may be the same or a different entity than that stored at block 403. Removal of edges (e.g., relationships) associated or connected to the node being removed may also be performed. The removal condition for a particular entity may be defined by the data retention type (e.g. entity level retention, version level retention, or relationship level retention) selected for that entity. For example, the removal condition may include an expiration of a valid period for the entity for entity level retention, expiration of all versions of an entity for version level retention, or expiration of all relationships for relationship level retention. In response to an occurrence of the removal condition specified by the data retention rule for the entity, the entity may be removed from the activity graph.

At block 407, a node associated with an entity may be removed from the activity graph based on a data decay rule (e.g., data decay annotation) associated with the entity. The entity may be the same or a different entity than those discussed above with respect to blocks 403 and 405. Removal of edges (e.g., relationships) associated or connected to the node being removed may also be performed. In some examples, the data decay rule may specify a threshold length of time for the entity and may be based on a duration that the entity was valid. For example, if an entity was valid for only a short period of time, the threshold length of time may be relatively short. If, however, the entity was valid for a long period of time, the threshold length of time may instead by relatively long. The actual length of time for the threshold length of time may be configured based on user or administrator preference. In some examples, in response to a duration that the entity is invalid or expired exceeding the threshold length of time, the entity may be removed from the activity graph. This has the effect of removing entities that were valid for a short amount of time more quickly after it is no longer valid than an entity that was valid for a long period of time. Thus, the shorter an entity or associated information is valid in the system, the more quickly it expires. Additionally, the longer an entity or associated information is invalid, the less likely it is to be retained.

At block 409, expired versions of an entity may be summarized in response to two or more entities, attributes, or relationships expiring, a threshold length of time occurring after expiring, or the like. The entity may be the same or a different entity than those discussed above with respect to blocks 403, 405, and 407. Whether or not versions of the entity are summarized may be based on a summarization annotation that was selected for that entity. A selection of the summarization annotation may cause the content of multiple versions to be combined into a single unit, thereby preserving at least some of the historical data. In this way, detailed changes can be replaced with summaries of these changes. The result of the summarization process when applied to multiple versions, each having an associated time period, is an aggregated set of versions with associated time periods. The entities, attributes, or relationships to be summarized may be summarized in response to two or more entities, attributes, or relationships expiring, a threshold length of time after expiring, or the like.

While blocks of process 400 are shown and described in a particular order, it should be appreciated that the blocks may be performed in any order and not all blocks need be performed. For example, blocks 403, 405, 407, and 409 may be performed based on an order of the events that trigger the execution of these blocks.

Computing System

FIG. 5 depicts computing system 500 with a number of components that may be used to perform the above-described processes. The main system 502 includes a motherboard 504 having an input/output ("I/O") section 506, one or more central processing units ("CPU") 508, and a memory section 510, which may have a flash memory card 512 related to it. The I/O section 506 is connected to a display 524, a keyboard 514, a disk storage unit 516, and a media drive unit 518. The media drive unit 518 can read/write a non-transitory computer-readable storage medium 520, which can contain programs 522 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of the present disclosure. For example, aspects of embodiments disclosed above can be combined in other combinations to form additional embodiments. Accordingly, all such modifications are intended to be included within the scope of the present disclosure.

What is claimed is:

1. A computer-implemented method for managing data in a data warehouse using an activity graph, the method comprising:
    accessing an activity graph comprising a plurality of interconnected nodes, wherein the plurality of interconnected nodes represent a plurality of entities, each entity defined by a tracking type, the tracking type defining a subset of attributes of the entity to be tracked for changes and one or more attributes configured to trigger a creation of a new version of the entity upon detection of a change;
    upon detection of a change in an attribute identified to trigger the creation of the new version of a first entity upon detection of the change, storing a new version of the first entity of the plurality of entities in the activity graph based on the change in the attribute of the first entity and the tracking type associated with the first entity;
    inserting a new node representing the new version of the first entity into the activity graph upon the detection of the change in the attribute identified to trigger the creation of the new version of the first entity upon detection of the change;
    removing a second entity of the plurality of entities from the activity graph based on a data retention rule associated with the second entity;
    removing a third entity of the plurality of entities from the activity graph based on an elapsed length of time and a data decay rule associated with the third entity; and
    summarizing the different versions of the first entity, each having an associated time period, by merging at least two of the three or more nodes into a single node.

2. The computer-implemented method of claim 1, wherein the plurality of entities represent a person, a user, a group, a computing resource, an activity, or an event.

3. The computer-implemented method of claim 1, wherein three or more nodes of the plurality of nodes represent different versions of a fourth entity.

4. The computer-implemented method of claim 3, further comprising: summarizing the different versions of the fourth entity by merging at least two of the three or more nodes into a single node.

5. The computer-implemented method of claim 1, wherein the tracking type associated with the first entity identifies a type of attribute that causes the storing of the new version of the first entity in the activity graph.

6. The computer-implemented method of claim 1, wherein the data retention rule identifies a data removal condition comprising an expiration of the second entity, an expiration of all versions of the second entity, or an expiration of all edges of the second entity.

7. The computer-implemented method of claim 6, wherein removing the second entity from the activity graph based on the data retention rule associated with the second entity comprises:
   removing a node associated with the second entity from the activity graph in response to the occurrence of the data removal condition.

8. The computer-implemented method of claim 1, wherein the data decay rule comprises a threshold duration associated with the third entity.

9. The computer-implemented method of claim 8, wherein removing the third entity from the activity graph based on the data decay rule associated with the third entity comprises:
   removing a node associated with the third entity from the activity graph in response to an elapsed length of time exceeding the threshold duration, wherein the elapsed length of time represents a duration that the third entity has been expired.

10. A non-transitory computer-readable storage medium comprising computer-executable instructions for managing data in a data warehouse using an activity graph, the computer-executable instructions comprising instructions for:
   accessing an activity graph comprising a plurality of interconnected nodes, wherein the plurality of interconnected nodes represent a plurality of entities, each entity defined by a tracking type, the tracking type defining a subset of attributes of the entity to be tracked for changes and one or more attributes configured to trigger a creation of a new version of the entity upon detection of a change;
   upon detection of a change in an attribute identified to trigger the creation of the new version of a first entity upon detection of the change, storing a new version of the first entity of the plurality of entities in the activity graph based on the change in the attribute of the first entity and the tracking type associated with the first entity;
   inserting a new node representing the new version of the first entity into the activity graph upon the detection of the change in the attribute identified to trigger the creation of the new version of the first entity upon detection of the change;
   removing a second entity of the plurality of entities from the activity graph based on a data retention rule associated with the second entity;
   removing a third entity of the plurality of entities from the activity graph based on an elapsed length of time and a data decay rule associated with the third entity; and
   summarizing the different versions of the first entity, each having an associated time period, by merging at least two of the three or more nodes into a single node.

11. The non-transitory computer-readable storage medium of claim 10, wherein the plurality of entities represent a person, a user, a group, a computing resource, an activity, or an event.

12. The non-transitory computer-readable storage medium of claim 10, wherein three or more nodes of the plurality of nodes represent different versions of a fourth entity.

13. The non-transitory computer-readable storage medium of claim 12, further comprising instructions for:
   summarizing the different versions of the fourth entity by merging at least two of the three or more nodes into a single node.

14. The non-transitory computer-readable storage medium of claim 10, wherein the tracking type associated with the first entity identifies a type of attribute that causes the storing of the new version of the first entity in the activity graph.

15. The non-transitory computer-readable storage medium of claim 10, wherein the data retention rule identifies a data removal condition comprising an expiration of the second entity, an expiration of all versions of the second entity, or an expiration of all edges of the second entity.

16. The non-transitory computer-readable storage medium of claim 15, wherein removing the second entity from the activity graph based on the data retention rule associated with the second entity comprises:
   removing a node associated with the second entity from the activity graph in response to the occurrence of the data removal condition.

17. The non-transitory computer-readable storage medium of claim 10, wherein the data decay rule comprises a threshold duration associated with the third entity.

18. The non-transitory computer-readable storage medium of claim 17, wherein removing the third entity from the activity graph based on the data decay rule associated with the third entity comprises:
   removing a node associated with the third entity from the activity graph in response to an elapsed length of time exceeding the threshold duration, wherein the elapsed length of time represents a duration that the third entity has been expired.

19. An apparatus for managing data in a data warehouse using an activity graph, the apparatus comprising:
   a memory comprising an activity graph; and
   a processor configured to:
   access the activity graph from the memory, the activity graph comprising a plurality of interconnected nodes, wherein the plurality of interconnected nodes represent a plurality of entities, each entity defined by a tracking type, the tracking type defining a subset of attributes of the entity to be tracked for changes and one or more attributes configured to trigger a creation of a new version of the entity upon detection of a change;
   upon detection of a change in an attribute identified to trigger the creation of the new version of a first entity upon detection of the change, store a new version of a first entity of the plurality of entities in the activity graph based on a change in an attribute of the first entity and a tracking type associated with the first entity;
   insert a new node representing the new version of the first entity into the activity graph upon the detection of the change in the attribute identified to trigger the creation of the new version of the first entity upon detection of the change;
   remove a second entity of the plurality of entities from the activity graph based on a data retention rule associated with the second entity;
   remove a third entity of the plurality of entities from the activity graph based on an elapsed length of time and a data decay rule associated with the third entity; and
   summarize the different versions of the first entity, each having an associated time period, by merging at least two of the three or more nodes into a single node.

20. The apparatus of claim 19, wherein the plurality of entities represent a person, a user, a group, a computing resource, an activity, or an event.

21. The apparatus of claim 19, wherein three or more nodes of the plurality of nodes represent different versions of a fourth entity.

22. The apparatus of claim 21, wherein the processor is further configured to:
   summarize the different versions of the fourth entity by merging at least two of the three or more nodes into a single node.

23. The apparatus of claim 19, wherein the tracking type associated with the first entity identifies a type of attribute that causes the storing of the new version of the first entity in the activity graph.

24. The apparatus of claim 19, wherein the data retention rule identifies a data removal condition comprising an expiration of the second entity, an expiration of all versions of the second entity, or an expiration of all edges of the second entity.

25. The apparatus of claim 24, wherein removing the second entity from the activity graph based on the data retention rule associated with the second entity comprises:
   removing a node associated with the second entity from the activity graph in response to the occurrence of the data removal condition.

26. The apparatus of claim 19, wherein the data decay rule comprises a threshold duration associated with the third entity.

27. The apparatus of claim 26, wherein removing the third entity from the activity graph based on the data decay rule associated with the third entity comprises:
   removing a node associated with the third entity from the activity graph in response to an elapsed length of time exceeding the threshold duration, wherein the elapsed length of time represents a duration that the third entity has been expired.

* * * * *